Figure 1:
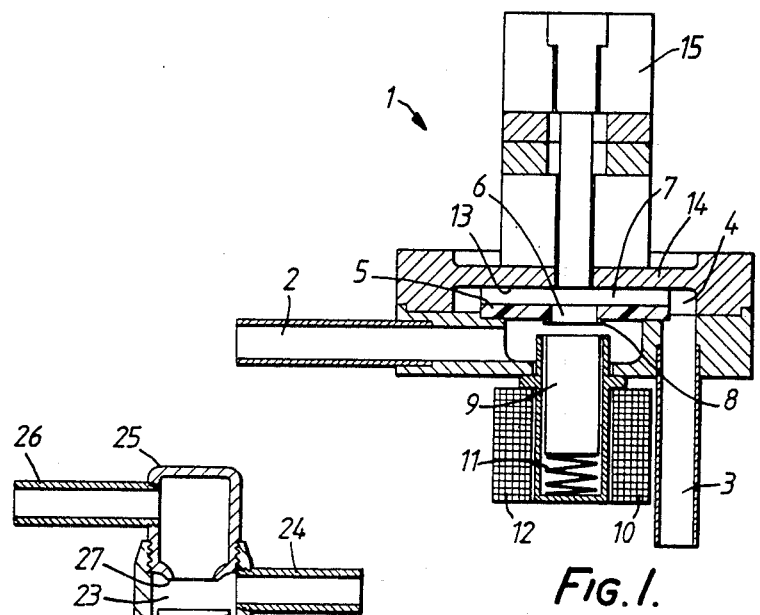

United States Patent [19]

Young

[11] Patent Number: 4,653,525

[45] Date of Patent: Mar. 31, 1987

[54] FLUID FLOW CONTROL VALVE

[75] Inventor: Michael J. R. Young, Ashburton, England

[73] Assignee: General Dispensing Systems Limited, London, England

[21] Appl. No.: 799,577

[22] Filed: Nov. 19, 1985

[30] Foreign Application Priority Data

Nov. 20, 1984 [GB] United Kingdom ............... 8429312

[51] Int. Cl.[4] ........................................... F16K 31/06
[52] U.S. Cl. ............................... 137/238; 251/129.15; 251/129.21
[58] Field of Search ............... 134/184; 137/15, 238; 251/129.06, 129.15, 129.21; 222/148; 366/127

[56] References Cited

U.S. PATENT DOCUMENTS

| 3,529,806 | 9/1970 | Kozel | 251/129.21 |
| 4,376,447 | 3/1983 | Chumley | 251/129.15 X |
| 4,389,999 | 6/1983 | Jaqua | 251/129.15 X |

FOREIGN PATENT DOCUMENTS 983369 12/1982 U.S.S.R. ................. 251/129.06

Primary Examiner—Gerald A. Michalsky
Attorney, Agent, or Firm—Scrivener and Clarke

[57] ABSTRACT

There is disclosed a control valve having an inlet 24, an outlet 26 connected a a valve cavity 23. The valve includes an armature 31 of a solenoid 32, movement of which opens a valve seal 28 seated in valve seat 27. A piezoceramic transducer 21 transmits ultrasonic vibrations through a tapering output section 22 to the valve cavity, whereby cavitation is induced in liquid therin to cause cleaning of the surfaces.

5 Claims, 4 Drawing Figures

FLUID FLOW CONTROL VALVE

This invention relates to a fluid flow control valve, and more particularly to a valve incorporating means to inhibit or prevent the undesirable build-up of deposits within the valve.

Certain fluid flow control valves are subject to the undesirable build-up of materials deposited from the fluid being controlled. Typical of such valves are valves used to control the flow of hard water, and in particular hard water at a temperature close to boiling. The undesirable build-up of deposits in this manner leads to severe difficulties, particularly in valves intended for automatic operation, for example the water dose valve in a hot drinks dispensing machine. The build-up of deposits e.g. of calcium carbonate, within such valves can rapidly lead to restriction of flow through the valve and interfere with proper closure of the valve. Such valves must be thoroughly cleaned or replaced at regular intervals, which in severe cases may be as short as 6 weeks. Such cleaning or replacing is clearly undesirable.

According to one aspect of the present invention there is provided a fluid flow control valve comprising: an inlet; an outlet; a valve cavity extending from the inlet to the outlet; a valve seat located in the valve cavity; a valve closure member engageable with the valve seat to prevent fluid flow through the valve cavity from the inlet to the outlet: and means to induce vibrations in the valve cavity to clean from surfaces of the valve cavity deposits adhering thereto.

In the preferred embodiment of the invention the vibrations are ultrasonic vibrations. The ultrasonic vibrations are generated by a suitable transducer for example a piezo ceramic sandwich transducer, and are used to resonate a diaphragm which forms one wall of the valve cavity. The transducer is driven by a solid state frequency converter with a power rating of up to 50 watts at frequencies in the range 20–100 KHz. The vibrating diaphragm produces a cavitation field within the valve cavity, thereby causing cavitation in the liquid contained within the valve cavity. The scrubbing action associated with the cavitation of the liquid removes deposits e.g. of calcium carbonate, as they are formed or shortly thereafter, thereby preventing a build-up of harmful scale on critical surfaces of the valve cavity.

The above and other features and advantages of the invention will become clear from the following description of a preferred embodiment thereof, given by way of example only, reference being had to the accompanying drawings wherein FIGS. 1 to 4 each show schematically and in cross-section an embodiment of a hot water control valve suitable, for example, for use in a hot drinks dispensing machine.

The valve 1 shown in FIG. 1 comprises an inlet 2 connected to an outlet 3 by a valve cavity 4. A PTFE insert 5 is located within the cavity 4 and includes a central aperture 6 and radial passages 7 connecting the central aperture of the downstream end of the valve cavity 4. A valve seat 8 is formed on the upstream surface of the insert 5 and is engageable by the movable pole-piece 9 of a solenoid 10 in order to close the valve to fluid flow. The pole-piece 9 is normally biased into sealing engagement with the seat 8 by a spring 11, and is movable out of engagement with the seat by energising the solenoid coil 12 to open the valve to fluid flow.

One wall 13 of the valve cavity 4 is formed by a diaphragm 14 which may be driven into resonance at an ultrasonic frequency by means of a piezo ceramic sandwich tranducer 15. The resonating diaphragm 14 induces cavitation in water located within the cavity 4, and this cavitation in turn produces a scrubbing action sufficient to remove light deposits of carbonate material from critical surfaces of the valve.

Valve cleaning is most effective if the entire valve is filled with water during operation of the transducer 15, and accordingly valve cleaning can be carried out most effectively by energising the transducer 15 each time the valve is open. This mode of operation ensures that deposits are removed as they are formed, and maintains the valve free of deposits at all times. In the alternative, however, valve cleaning may be carried out automatically during periods of low demand, e.g. over night. If this is the case, the valve 10 may be opened and cold water caused to flow through the valve during cleaning operations.

It will be appreciated that the above described valve is particularly suitable for controlling the flow of hot hard water, and has been found particularly suitable for use in hot drinks dispensing machines. The valve is reasonably compact, and can be used as a direct replacement for a conventional solenoid operated valve in such machine.

Figure 2:
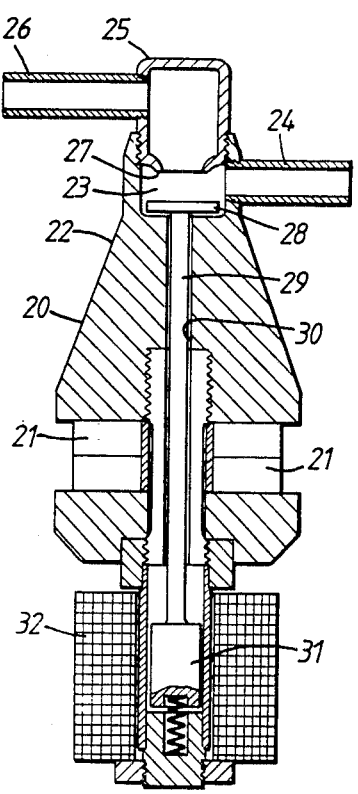

Referring now to FIG. 2 a second embodiment of the invention is shown. In this embodiment a piezo ceramic sandwich transducer 20 having piezo crystals 21 is formed with tapering output section 22 which terminates in a valve cavity 23. An inlet tube 24 is secured to the output section 22, as is a cap 25 which carries an outlet tube 26. The dimensions of the cap are chosen so that it resonates at the same frequency as the transducer. This factor, together with the gain produced by the tapering output section 22 ensures that high amplitude vibrations occur within the cavity 23 and cap 25.

The cap 25 is preferably removable and defines a valve seat 27 which is engageable by a valve head 28. The valve head is carried by a stem 29 which extends through an axial passage 30 in the transducer 20. The stem 29 is secured to the armature 31 of a solenoid 32 and is normally biased upward as viewed in FIG. 2 whereby the valve head 28 is normally in engagement with the seat 27 to close the valve to fluid flow.

The high amplitude vibrations produced in the cavity 23 and cap 25 ensure cavitation in the liquid in contact with all critical surfaces of the valve, thereby preventing the build up of scale.

Figure 3:
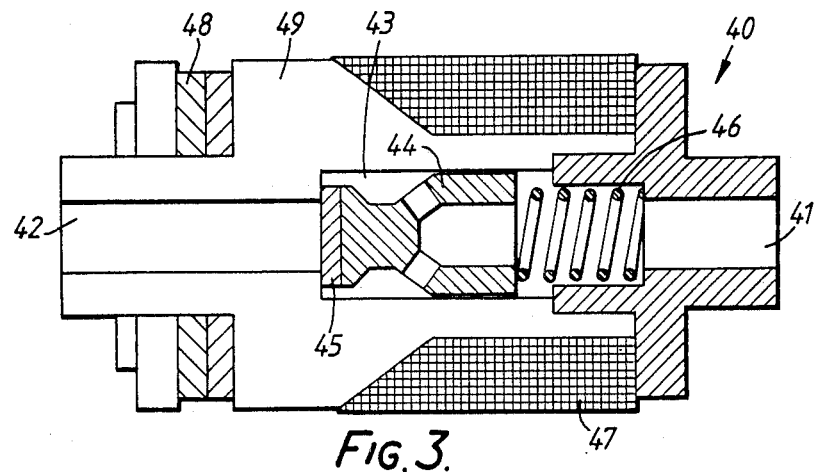
Figure 4:
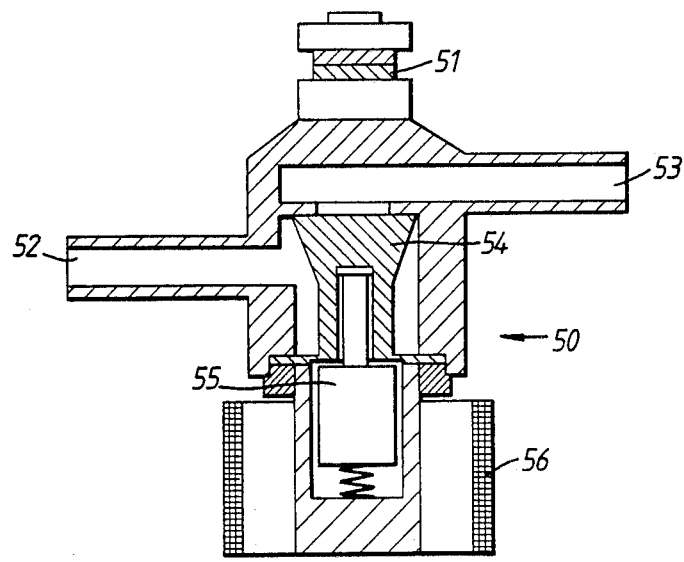

Referring now to FIG. 3, there is shown as a third embodiment of the invention, an axisymmetric valve 40. It comprises a substantially coaxial inlet 41 and outlet 42, each extending from a valve cavity 43. Within the valve cavity is an armature 44 connected to a seal 45 which is normally biassed into sealing engagement with the exit of the cavity by means of spring 46. Surrounding the valve is a solenoid coil 47 which on actuation displaces the armature 44 against the spring bias away from the valve seat, thereby permitting fluid flow. A piezoceramic sandwich transducer 48 is located around the outlet end of the valve and has a tapering output section 49 which surrounds the valve cavity 43. Thus actuation of the transducer causes vibrations within the valve cavity 43 which lead to cavitation in liquid therein and the removal of scale. A further embodiment is shown in FIG. 4 in which an otherwise conventional fluid control valve 50 is provided with an ultrasonic transducer 51 attached to a flat end face of the cylindrical valve body. In all other respects, the valve 50 is conventional, having an inlet 52, outlet 53, seal 54, armature 55 and solenoid coil 56.

Field tests have been carried out on a series of valves based on the embodiment illustrated in FIG. 2. The test site was located in a hard water area, and testing was conducted intermittently, over a period of six months. Pairs of brass and stainless steel valves were constructed and in each case one non-vibrated valve of identical design was used as the control during the test period. The valves were tested in pairs on a continuous switching cycle covering over 100,000 operations. Visual examination of both stainless and brass valves following each test run showed a significant build up of lime scale in the non-vibrated controls. By contrast, the activated valves were completely free from scale in the critical seating region, with only slight traces in the inlet and outlet tubes.

These tests show that ultrasonically induced cavitation can effectively remove lime scale deposits which are unavoidable in conventional hot water control valves operating in hard water areas.

I claim:

1. A self-cleaning liquid flow control valve comprising a body having a valve cavity therein which cavity includes an inlet, an outlet, a valve seat, and a valve closure member engageable with said valve seat to prevent liquid flow from the inlet to the outlet, and means for cleaning surfaces in said cavity which, during use, are contacted by liquid containing material capable of being deposited on said surfaces, comprising a piezoceramic sandwich transducer associated with said body and operable to induce ultrasonic vibrations throughout said cavity of such a frequency as to cause cavitation of liquid in said cavity and consequent scrubbing action on said surfaces by said cavitating liquid to remove and prevent the build up of deposits on said surfaces.

2. A valve as claimed in claim 1, wherein the ultrasonic vibrations are transmitted to the valve cavity by means of a resonateable diaphragm.

3. A valve as claimed in claim 1, wherein the ultrasonic vibrations are transmitted to the valve cavity by means of a tapering output section of the transducer.

4. A valve as claimed in claim 5, wherein the output section extends around the valve cavity.

5. A valve as claimed in claim 1, wherein the vibrations are induced in those periods when the valve is open and liquid flows from the inlet to the outlet.

* * * * *